May 18, 1926.
W. D. PACK
IMPULSE TRANSMITTER, REPRODUCER, AND RECORDER
Filed April 23, 1924
1,585,204
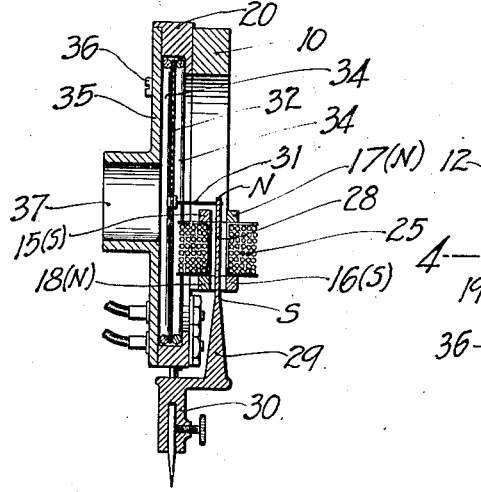
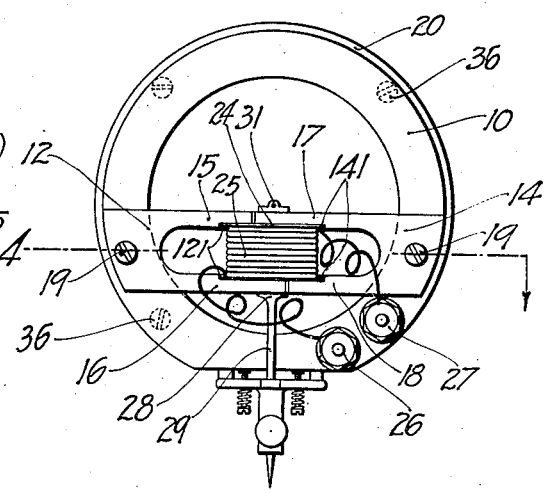
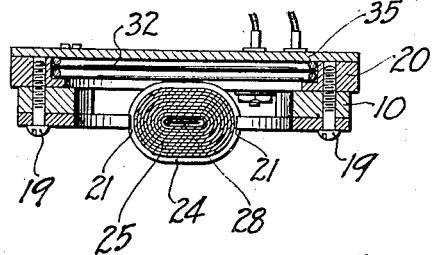
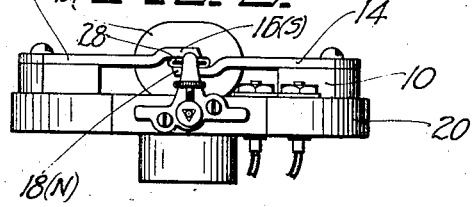
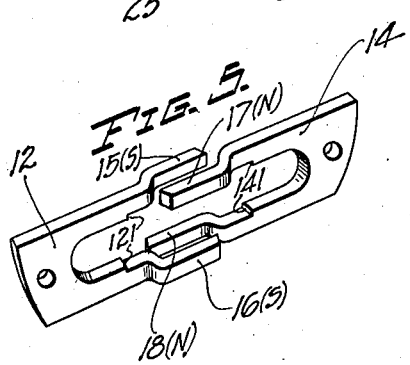
Inventor
WEHRLI D. PACK,
By *A. H. Mallinckrodt,*
Attorney Patented May 18, 1926.

1,585,204

UNITED STATES PATENT OFFICE.

WEHRLI D. PACK, OF SALT LAKE CITY, UTAH, ASSIGNOR TO JOSEPH N. PEPIN, OF CHICAGO, ILLINOIS.

IMPULSE TRANSMITTER, REPRODUCER, AND RECORDER.

Application filed April 23, 1924. Serial No. 708,562.

This invention relates to an impulse transmitter, reproducer and recorder, combining the features of a radio receiver with those of a phonograph reproducer, and its principal objects are:

First. To achieve economy of cost by combining the elements so that the reproducer can be used for phonograph records or for radio direct.

Second. To save time for the user in not having to change parts for either purpose, making the instrument immediately available in either capacity.

Third. To make it possible to transmit electrical impulses or undulations in harmony with, and controlled by, a phonograph record.

Fourth. To record electrically received messages or signals.

Fifth. To produce an instrument having few parts of simple design, so that the maximum economy in cost of manufacture may be realized.

In achieving the objects outlined above, I utilize a reproducer having a diaphragm and stylus bar, such as are used in ordinary phonographs. Around a part of the circumference of the diaphragm casing or body ring of a phonograph reproducer, I place a permanent magnet following the circumference of the body ring, and having in general a horseshoe form. At the extremities of the magnet are fastened pole pieces, so arranged that a coil may be accommodated in a space within the pole pieces. The coil is so placed that the upper part of the stylus bar may extend through it to form an armature, this being arranged to oscillate between the limbs of the pole pieces. The stylus bar is connected to the diaphragm in the usual manner so that any electric impulses received by the coil, shall be communicated to the diaphragm, as well as to the stylus held by the stylus bar.

Thus, any electrical impulses received through the coil will actuate the diaphragm and the stylus simultaneously; conversely, any sound waves striking the diaphragm through the air, will cause simultaneously, electrical impulses in the coil and a movement of the stylus. Further, the electrical impulses or the sound waves in the air, may be caused by the stylus actuated by the record.

The features of this invention, for which the protection of letters patent is desired, are collectively grouped in the claims concluding this specification.

In the drawing,

Fig. 1 represents an elevation of a sound reproducer equipped with my improvement.

Fig. 2, a transverse vertical section thereof.

Fig. 3, a bottom plan view,

Fig. 4, a section on line 4—4 in Fig. 1, and

Fig. 5, a perspective of the pole pieces in detail, in operative position relatively to each other.

Referring to the drawing, 10 indicates a permanent magnet preferably in the form of a portion of a circular ring, having substantially a horseshoe form, one end of which carries the pole piece 12, and the other the pole piece 14. The pole pieces 12 and 14, may be of U-shape and have the limbs 15 and 16, and 17 and 18, respectively. The permanent magnet 10 may be shouldered to receive the pole pieces, which are fastened by means of the screws 19, these latter extending through the magnet and into the annular body ring 20 forming the diaphragm casing. The pole pieces 12 and 14 are shouldered at 121 and 141 respectively, to receive the notched portions 21 of the spool 24. The coil 25 is wound upon the spool in the usual manner, and the terminals thereof, connected to the binding posts 26 and 27.

An armature 28 forming the upper end of the arm 29 of the stylus holder 30, extends through the coil and between the limbs of the pole pieces 12 and 14. The armature is connected by a link or stem 31 to the diaphragm 32, while the latter is held in the body ring 20 by means of the gaskets 34, and clamped in place by the disk 35, which is fastened to the body ring by the screws 36. Disk 35 has the hub 37 for connecting to the usual tone arm (not shown).

The armature is normally balanced between the pole pieces as indicated in Fig.

2, and being of soft iron, is not magnetized.

The limbs 17 and 18 of the pole piece 14, may be assumed as being attached to the N-pole of the permanent magnet, and therefore to have "N" polarity. At the same time, the limbs 15 and 16 of the pole piece 12 may be assumed to have "S" polarity, being attached to the S-pole of the permanent magnet. When an electric current passes through the coil in one direction, the end marked "N" of the armature, becomes positive, and is repelled by the pole 17(N), and attracted by the pole 15(S), while at the same time the armature becomes negative at "S", and is repelled by pole 16(S), and attracted by pole 18(N), causing the armature to move towards the diaphragm.

When the electric current ceases to flow, the armature springs back to its original position. This movement of course, is communicated to the diaphragm by the connecting link 31.

When the current flows in the opposite direction, the movement of the armature is reversed, this motion again being communicated to the diaphgram. Thus the diaphragm is made to vibrate and to produce sound waves in harmony with the electrical impulses in the coil.

The peculiar action of the armature as just described, is secured by offsetting the two limbs of each pole piece, and placing them upon opposite sides of the plane of the armature, so that the attraction between the dissimilar poles of the pole pieces and the armature, and the repulsion between the similar poles of the pole pieces and the armature, shall act to move the armature wholly in one direction or wholly in the opposite direction, and of course, communicate this action to the diaphragm and to the stylus.

In Fig. 5, the relation between the poles of each of the pole pieces 12 and 14, is clearly shown. In this figure it will be seen that the limbs of each pole piece are bent so that their extremities will lie upon opposite sides of the center plane of the armature, and preferably in planes parallel thereto, so that the two poles of each pole piece, alternate with each other.

While a specific embodiment of this invention is herein shown and described, it is to be clearly understood that the detailed parts thereof, may, or may not, be shown in the preferred forms, and further, that the preferred forms may be varied from time to time, as the development of this invention and the arts with which it is identified progress.

To the skilled inquirer, therefore, that which forms an essential and characteristic part of this invention will be readily discernible from the claims in which its spirit is broadly generalized.

Having fully described my invention, what I claim is:

1. The combination with a reproducer having a stylus bar and a body ring, of a permanent magnet disposed in proximity thereto, and following substantially the contour thereof, pole pieces attached to the permanent magnet, a coil disposed between the said pole pieces and an armature passing through the said coil, the said armature forming a part of the said stylus bar.

2. A sound reproducer having a body ring with a stylus bar operatively mounted thereon, a permanent magnet having substantially a horseshoe form, adjacent the body ring, pole pieces extending inwardly from the poles of the said magnet, said pole pieces being offset from, and located opposite, each other, in spaced relation to each other, and an armature extending operatively between the said pole pieces, said armature forming a part of the said stylus bar.

3. A permanent magnet having substantially a horseshoe form, pole pieces extending inwardly from the poles thereof, said pole pieces having each two limbs, said limbs being offset and spaced apart from each other alternately, so that a pair of limbs having dissimilar poles, shall lie upon each side of a center plane, an armature located substantially in the center plane, a coil for energizing said armature, and means, actuated by said armature, for recording electrical impulses passing through said coil.

4. A permanent magnet having substantially a horseshoe form, pole pieces extending inwardly from the poles thereof, said pole pieces having each two limbs, said limbs being offset and spaced apart from each other alternately, so that two limbs, each one belonging to a different pole piece and having dissimilar poles, shall lie adjacent each other upon each side of a center plane, an armature having its plane lying substantially in the center plane, a coil for energizing said armature, and means, connected to said armature, for producing sound waves in harmony with said impulses.

5. A permanent magnet having substantially a U-form, pole pieces having substantially a U-form, said pole pieces being attached to the poles of the permanent magnet, and extending inwardly therefrom, the limbs of each of the said pole pieces being spaced apart from the limbs of the other pole piece in overlapping and alternating relation, an armature operatively located between said limbs, a coil located within said limbs and arranged to energize said armature, and means whereby said armature shall simultaneously impart motion in harmony with electrical impulses passing through said coil, to an impulse reproducer and to an impulse recorder.

6. A permanent magnet, pole pieces at the poles of the permanent magnet, the extremities of the said pole pieces arranged in spaced and alternately overlapping relation to each other an armature operatively located between said extremities, a notched spool surrounding said armature, shouldered portions on said pole pieces for engaging the notches of said spool, a coil wound upon said spool, and means for reproducing or recording electrical impulses passing through said coil.

In testimony whereof I sign my name hereto.

WEHRLI D. PACK.